INVENTORS
WALTER B. PALMER
ROBERT E. SMITH
JOHN P. McNALLY
BY Edward O. Ansell
Joseph E. Mueth
ATTORNEYS United States Patent Office 3,384,505
Patented May 21, 1968

3,384,505
IMPREGNATION AND PARTIAL POLYMERIZATION OF RESIN COATED WOUND GLASS FIBER PACKAGE
Walter B. Palmer, Duarte, and Robert E. Smith and John P. McNally, Azusa, Calif., assignors to Aerojet-General Corporation, Azusa, Calif., a corporation of Ohio
Filed July 12, 1963, Ser. No. 294,521
5 Claims. (Cl. 117—54)

ABSTRACT OF THE DISCLOSURE

This invention relates to a novel method of performing in-the-package application of a resin coating to fiberous materials, preferably glass fibers, and cloth materials woven from such fibers. The particular feature of the method is the coating of fibers of a wound package of fibers with a resin, the fibers remaining in wound package form while thus being resin coated.

---

Figure 1:
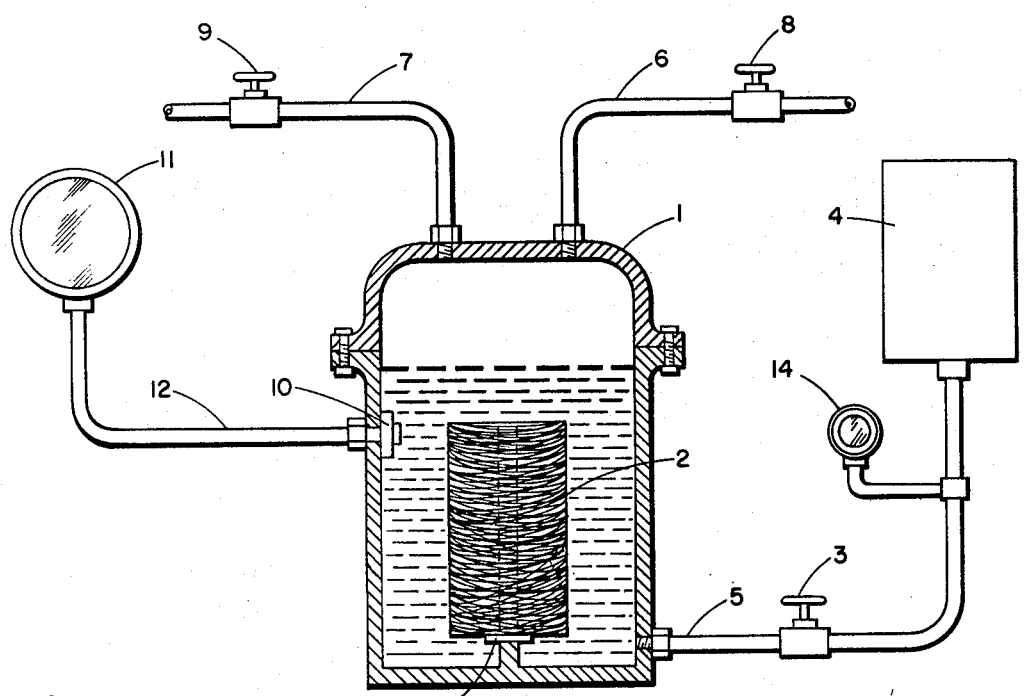

Continuous fiber, particularly glass fibers for use in the preparation of reinforced plastic structures, are normally supplied by the manufacturer wound on a spool or core and in the shape of a ball or roll. These balls or rolls are referred to in the art as "packages." The package may be spherical or cylindrical in shape, with the latter form being the most common. In using the fibers for the production of structural articles, a resin coating is normally first applied and partially cured. The resin-coated fibers may then be wound, on a mandrel for example, to the shape of the desired structural article. This winding is then heated to complete the resin cure and form a solid integral structure of fiber-reinforced plastic. Such fiber-reinforced plastic structures have many uses, such as for storage tanks, fuel tanks, drums, hulls, and the ilke.

Previously, in the resin coating of fibers, the fiber is first unwound from the spool on which it is normally supplied by the manufacturer, impregnated or coated in the unwound condition with resin solution, the resin-coated fiber then partially cured, and finally rewound on the spool. During the process of winding, impregnating, curing and rewinding, the fibers are subjected to stresses which have an adverse effect on their strength. For example, with commercial glass roving, these operations reduce the tensile strength from about 600,000 p.s.i. to about 300,000 p.s.i. Also the unwinding and rewinding operations previously required to coat the fibers take considerable time and result in considerable expense.

It is an object of this invention to provide a novel method of applying a resin coating to fibers, such as glass filaments, glass roving, glass cloth, beryllia fibers, quartz cloth, carbon fibers, and the like. It is another object of this invention to apply resin coating to fibers in a manner which avoids the waste and weakening of the fibers previously associated with such resin coating techniques. These and other objects of this invention will be apparent from the detailed description which follows.

According to the present invention, it has now been found that the fiber can be resin-coated in a wound condition, that is, a package of wound fiber as supplied by the manufacturer may be directly coated with resin in such a manner that all of the fibers in the package are uniformly covered with partially cured resin. This is done without first unwinding the fiber, coating it and then rewinding.

The method of uniformly impregnating a dry-package of wound fibrous material according to this invention involves placing the package in a vessel adapted to be sealed off from the atmosphere and subjecting the package to vacuum to remove any entrapped air within the package and completely submerging the dry package in a liquid medium containing a heat curable (thermo-setting) resin composition which is essentially free of cross-linking. The resin in said liquid medium is referred to as "A" stage resin. The resin medium preferably has a viscosity of less than 20,000 centipoise, measured at 25° C. To the resin medium containing the package, is then applied pressure until the package has taken up a volume of resin medium equal to $V_m$. The value of $V_m$ may be calculated for any specific package in accordance with the following equation.

(I)
$$V_m = V_p - \frac{W_p}{\rho_r}$$

wherein $V_m$ = volume of resin medium taken up
$V_p$ = volume of package being impregnated exclusive of core opening or other orifices
$W_p$ = weight of dry untreated package
$\rho_r$ = density of the fiber from which the package was prepared.

It should be noted that the formula applies to the resin volume picked up by the fibers, and, of course, does not pertain to the spool or core member if one is used.

The package is then removed from the unabsorbed liquid resin and heated to convert the resin within the package to a "B" stage, that is, to a partially cured state. This heating also will effectively remove all or almost all of solvents which were present in the resin medium.

More particularly, in the practice of the process of this invention, the package of wound fiber, preferably a ball of wound glass filament, is first dried in order to remove the majority of surface moisture. The drying may be readily accomplished by placing the package in a circulating air oven maintained at 100 to 150° F. for 1 to 10 hours. The dried package is then placed in a pressure vessel. A vacuum is drawn on the vessel so that the internal pressure within the vessel is reduced to about 1 to 10 pounds per square inch absolute, and preferably to about 5 pounds per square inch absolute. The application of the vacuum removes air trapped in the interstices of the package, thus facilitating subsequent resin pick-up. The vacuum is normally applied by a line attached to the vessel, normally near the top of the vessel. After the pressure has been reduced, a liquid resin in the "A" stage or solution of such resin is fed into the partially evacuated pressure vessel. Preferably, although not necessarily, the vessel is fitted with a liquid level detector, sight glass or a float in conjunction with an external gage. In this manner the amount of resin within the vessel can be known at a given time. The liquid level gage or sight glass should be calibrated so that the level corresponding to the top of the package is known since the resin level should be maintained at least at that level in order to achieve complete impregnation. The resin is customarily, although not necessarily fed in through a pipe located at or near the bottom of the pressure vessel.

When sufficient liquid resin has been fed to the vessel to at least completely cover the ball of wound filament, the flow of resin to the vessel may be shut off. In such case, resin medium must be added stepwise or continuously during subsequent pressurization until the amount of resin medium added closely approximates $V_m$ as determined by Equation I. Pressurization is continued until the resin level returns to that corresponding to the amount necessary to just cover the package. Alternatively, the package may be just covered with resin medium and then a volume of additional resin medium corresponding to at least $V_m$ added. Pressure is then applied until a volume equal to $V_m$ is taken up.

The pressure vessel containing the package of fiber and resin medium covering the package is then subjected to pressure imposed by admitting a gas under pressure through a line into the pressure vessel. The line admitting the gas under pressure is customarily located at the top of the pressure vessel. The pressure imposed by the introduced gas normally ranges from about 10 to about 250 pounds per square inch gage. The time during which the pressure is exerted can vary, and will depend upon the nature of the package and the viscosity of the resin surrounding the ball of filament. In any case, the pressure is maintained until a volume of resin medium is taken up as determined by Equation I, above.

Following release of the pressure the impregnated package of fiber is removed from the pressure vessel and placed in an oven. The oven is maintained at a sufficiently high temperature to remove excess solvents from the absorbed impregnating liquid resin medium and to advance the degree of polymerization of resin system to the "B" stage. Preferably, during "B" staging the oven is maintained at a temperature of from about 100° F. to about 150° F., and a pressure of from 20 mm. Hg to about 760 mm. Hg, although the temperature and pressure may be varied depending upon the particular liquid resin employed. The time during which the impregnated package is retained within the oven may be varied but normally it is on the order of from about 30 minutes to about 20 hours. During this "B" staging operation, the package may be, although not necessarily, continuously rotated about its horizontal axis to provide more uniform distribution of resin throughout the roll.

Following treatment in the vacuum oven, the impregnated ball of filament can be stored in a refrigerated box maintained below about 40° F. until ready to use. The maintenance of the ball in refrigerated storage prevents the completion of the polymerization of the resin coating prior to use of the impregnated filament.

The impregnation procedure of this invention is further illustrated in FIG. 1, which is a schematic view of an illustrative apparatus as it is utilized during the impregnation of a package of glass roving.

Referring to FIG. 1, the vessel 1, as shown, contains within it the package of roving 2 which is undergoing impregnation. The package within the vessel is held in a vertical position by the pin support 13. The resin media is supplied to vessel 1 via line 5 from resin media storage tank 4. The amount of resin added is continuously recorded on recorder 14, with the resin addition being controlled by valve 3. Vessel 1 is also fitted with a liquid level detecting device 10. This liquid level detecting device operates a liquid level indicator 11 via conduit 12.

In operation, the process shown schematically in FIG. 1 enables the operator to readily determine when the proper amount of media ($V_m$), has been absorbed by the package 2. This is done by simply opening valve 3 and permitting resin media to flow into vessel 1 until the liquid level rises to the top of the roving package 2. This liquid level is observed on liquid level indicator 11. To impregnate, then, the operator simply opens valve 3 until recorder 14 indicates that an additional amount of resin $V_m$ has been added. Impregnation is then continued until indicator 11 shows that the level of the resin media within vessel 1 has returned to that corresponding to the top of the roving package. At this point it is apparent that a volume of resin equal to $V_m$ has been taken up by roving, thus indicating completion of impregnation. At this point, this phase of the process may be terminated.

Vessel 1, as can be seen from FIG. 1, is also fitted with two lines at the top, each line being fitted with a control valve. Line 7 leads to a vacuum pump (not shown), which is used prior to the resin media addition in order to evacuate vessel 1 and the roving package present therein. This vacuumizing operation can be controlled by valve 9.

The other line at the top of vessel 1, line 6, leads to a source of inert gas under high pressure. This high pressure gas may be used to facilitate impregnation. The pressurization is controlled by valve 8. Valve 9 in line 7 is in the open position during the vacuumization of the vessel but is closed during impregnation.

The apparatus shown in FIG. 1 is merely illustrative of the equipment which may be employed in carrying out the impregnation according to this invention. Many variations will be apparent to those skilled in the art. For example, it is envisioned that a vessel may be used which is sufficiently large to contain a plurality of roving packages, thus permitting the impregnation of several packages simultaneously.

After impregnation in vessel 1 is complete, the roving is ready to be removed to an oven for "B" staging, as is described above.

Figure 2:
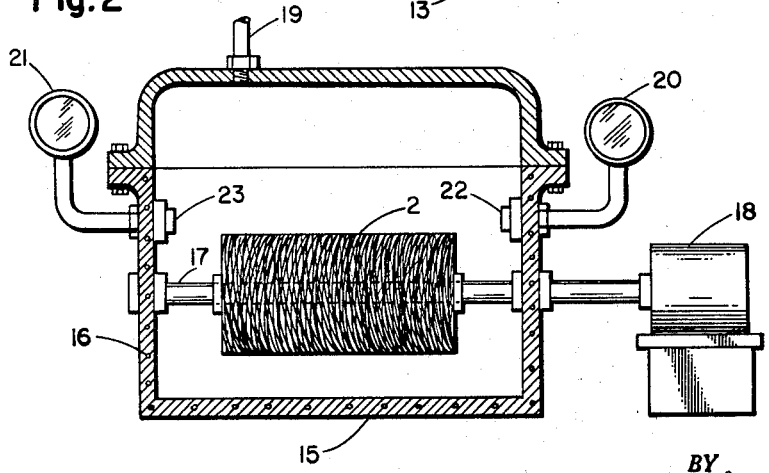

One apparatus for carrying out the "B" staging is shown schematically in FIG. 2. The roving package 2 is placed in oven 15 which is equipped with external heating elements 16. The package 2 is mounted within the oven shaft 17 which may be turned by motor 18. In this manner, the package may be continuously horizontally rotated during "B" staging to provide uniformity of resin distribution throughout. Oven 15 is also equipped with a vacuum line 19. The pressure within oven 15 is measured by pressure detector 22 and shown on pressure indicator 20. In this way the pressure within the oven during "B" staging may be maintained at any desired reduced level. The temperature detector 23 operates temperature indicator 21, thus permitting the operator to vary the power supplied to heating elements 16 in order to provide temperatures within the oven suitable for "B" staging.

The packages impregnated by our process may be composed of many windings of fiber or continuous filament. Such fibers or filaments are of small diameter of from about 0.00006 inch to about 0.00060 inch. More commonly, the package is made up of a continuous winding of a group of fibers or filaments. Such a group of fibers or filaments is called an end or strand, if a twist has not been applied. If a twist has been applied to a group of fibers or filaments, the winding is called a yarn. Sometimes a number of ends or strands are gathered into a ribbon and wound onto a tubular core. This wound ribbon is known as roving. This invention is applicable to any package of fiber or filament material whether in the form of end or strand, yarn or roving. The package itself may be of any shape, that is, cylindrical, spherical, etc. The invention is also applicable to packages of woven or unwoven materials such as, bolts of cloth, fabric, paper, matting and the like. This invention finds particular application in the impregnation of a package of glass roving.

When it is desired to use the package of resin-coated fiber, the fiber is normally wound, around a mandrel for example. The wound fiber is then cured at a temperature sufficient to completely cure the resin coating. In this manner, a solid rigid integral article may be made from the impregnated filaments prepared according to this invention.

It has been found that by the process of our invention, there is obtained a superior resin-coated fiber which upon incorporation in a filament wound article possess greater strength than articles prepared from filaments which have been subjected to unwinding and rewinding operations previously required for impregnation.

Normally, the resin medium in which the package is submerged is a curable liquid resin containing a curing agent; a mixture of curable normally liquid resin, curing agent and solvent; or a normally solid curable resin dissolved in an appropriate solvent together with curing agent. At this point, the resin is in any event, uncured and thermoplastic. Such resins are said to be in the "A" stage.

Typical of suitable curable resins are the epoxy resins such as those having the general formula

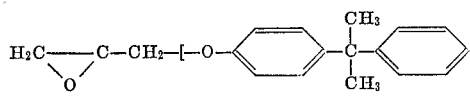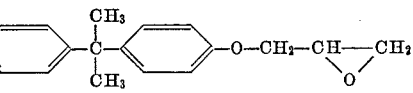

wherein $n$ is zero or integer of from about 1 to 50. As can be seen from the above equation, the epoxy resins are the polyglycidyl ethers of 2,2(4-hydroxyphenyl) propane. The epoxy resin medium employed in the impregnation process of this invention contain one or more well-known epoxy curing agents such as hexahydrophthalic anhydride, methyl nadic anhydride, benzyldimethylamine, dodecanyl succinic anhydride, ethylene diamine and the like.

Preferred epoxy resins for use in this invention include the material sold by Shell Chemical Co. under the tradename of Epon 828. This liquid epoxy has a molecular weight of about 400 and a viscosity at 25° C. within the range of from about 5,000 to 15,000 centipoise. Another preferred epoxy is the material sold by Dow Chemical Co. under the name DER 332. This liquid epoxy has a molecular weight of about 340 to 350, and a viscosity at 25° C. of from about 3,600 to 6,400 centipoise. The preferred epoxy resins have an epoxide equivalent equal to about 180 to 220.

Other suitable thermosetting liquid resins are the phenol aldehydes having the formula

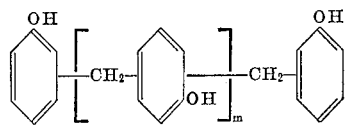

wherein $m$ is an integer of from 1 to about 50. Urea-formaldehyde and melamine-formaldehyde resins may also be employed.

Exemplary of other synthetic thermosetting resins which may be used are a composition comprising a substantially linear ethylenically unsaturated polyester having a molecular weight of from about 500 to about 10,000; and an ethylenically unsaturated monomer which is copolymerizable and miscible with the polyester. Thus, for example, the composition may be polydiethylene glycol maleate or polydiethylene glycol fumarate having incorporated therewith styrene, vinyl acetate, methyl methacrylate, or vinyl chloride. The curing of such a polyester-ethylenically unsaturated monomer system is aided by using a curing catalyst such as benzoyl peroxide or phthalyl peroxide; and a hardener such as cobalt naphthenate. Such thermosetting resins are well known in the art and reference may be made to Patent 2,255,313, issued Sept. 9, 1941, for further information relative to them.

As noted above, the resin medium used to impregnate the package may contain resin and curing agent only, or together with solvent. In any event, the medium (including any solvent) should have a viscosity of less than 20,000 centipoise at 25° C., and preferably in the range of from 50 centipoise to about 1500 centipoise at 25° C. The ratio of curing agent to resin may be varied over a wide range. The curing agent should always be present in an amount effective to substantially completely cure the resin to the "C" stage (essentially complete resin cure) when the wound coated fibers are fused into an integral article of the desired shape. Normally, the weight ratio of curing agent to resin is within the range of from about 1/1 to about 1/100.

If a solvent is used, it should be present in an amount of from about 10 percent to about 300 percent by weight of combined resin and curing agent. More preferably, the weight ratio of total resin ingredients to solvent is about 3.5/2.0. The choice of solvent is not critical and any substantially inert volatile material in which the resin and curing agent are at least partially soluble and having a vapor pressure of at least 5 mm. Hg at 20° C. may be utilized. Less volatile materials are not suitable since they cannot be completely removed from the impregnated package. Illustrative of suitable solvents are the ketones such as acetone, and methyl ethyl ketone, the lower alkanols such as methanol, and the hydrocarbons such as butane and benzene.

The resin in the liquid impregnating medium must be substantially uncured. Such resins are referred to as "A" state resins, as is noted above. After impregnation, the package containing liquid resin medium is heated to remove any volatiles or solvents, and advance the resin to a partially cured stage, that is, to the "B" stage. The conversion from "A" to "B" stage is carried out by maintaining the package containing the "A" stage resin at a temperature of from about room temperature to about 150° F. for from about 0.1 to 36 hours. However, it should be understood that the exact time and temperature required is a function of the particular resin system employed. These partially cured or semi-thermoplastic resins known as "B" stage resins are normally solids at room temperature, but undergo melting to viscous liquids at temperatures above about 100° F., and normally within the range from 120° F. to 160° F.

The "B" stage epoxy resins are disclosed in greater detail in "Epoxy Resins," by Lee and Neville, McGraw-Hill, 1957, pages 52 through 62.

In "B" stage the resins are slightly tacky to the touch at room temperature but are capable of further curing to a completely cured state by heating. The completely cured or thermoset resin is known as a "C" stage resin. The conversion from "B" to "C" stage is carried out after the coated fibers prepared according to this invention are wound on a mandrel or the like, and it is desired to fuse the coated fibers to form an integral article. This fusing is achieved by heating the wound fibers to about 100° F., at which point the "B" stage resin melts. Heating is then continued at about 250° F. to 350° F. for from 1 to about 36 hours to complete the cure, that is, convert the resin from "B" stage to "C" stage.

In the use of the coated fibers prepared according to this invention and containing a coating of "B" stage resin, the winding on the mandrel is facilitated by the fact that the "B" stage resin is slightly tacky at the winding temperature, normally room temperature. This slight tack prevents the fiber from slipping from the proper place before it can be fixed in place by curing.

The following examples are presented for purposes of illustration only and should not be regarded as limitative of the scope of the invention in any way. In the example the parts are by weight unless otherwise indicated.

Example I

A package of glass roving, 6.5 inches in outside diameter and about 10 inches long was preheated to approximately 120° F. until all of the moisture was removed. The dry ball of roving was then placed in an impregnation pressurization tank. The absolute pressure in the tank was then reduced to about 5 pounds per square inch absolute by drawing a vacuum through a line connected to the top of the tank. The resin valve located at the bottom of the tank was then opened and a liquid resin solution consisting of 100 parts of an epoxy resin having a molecular weight of about 500, 90 parts of methyl nadic anhydride, 1 part of benzyldimethylamine and 20 parts of acetone was admitted until the ball of roving was completely submerged. The resin valve and the vacuum line valve were then closed. The gaseous pressure line valve located at the top of the tank was then opened and an absolute pressure of about 200 pounds per square inch was maintained until the ball of roving was completely impregnated. The gaseous pressure line was then shut off. The impregnated ball was then removed from the impregnation tank and placed in a vacuum oven maintained at approximately 120° F. for about 2 hours. At the end of this time all of the solvent had been removed and the degree of polymerization present had advanced to a partially cured condition ("B" stage).

Example II

The process of Example I was repeated employing as the resin impregnating solution a composition containing 100 parts by weight of DER 322, 4.5 parts of hexahydrophthalic anhydride, 0.5 part benzyldimethylamine and 20 parts acetone. Impregnation was carried out as set forth in Example I. Similar results were obtained.

When the foregoing example is repeated employing a resin medium containing 50 parts of a phenol-formaldehyde resin in 50 parts methanol, in lieu of the epoxy-acetone impregnating medium, equally satisfactory results are obtained.

In a more particular embodiment, the impregnation process of this invention involves subjecting a cylindrical package of dry glass roving having an outside diameter from about 3 to about 12 inches to a vacuum on the order of from about 1 to about 10 pounds per square inch absolute. The dry package is submerged in liquid resin medium which comprises a heat curable epoxy, polyester, or phenolic resin composition which is essentially free of cross-linking in conjunction with substantially inert solvent in which said resin is at least partially soluble, the solvent having a vapor pressure of at least 5 mm. Hg at 20° C. Pressure is then imposed by the introduction of gas. The pressure of impregnation is on the order of from about 10 to about 250 per square inch gage and is continued until a volume of resin equal to $V_m$ has been taken up by the roving package. The roving package after removal from the unabsorbed resin media, is then "B" staged at a temperature of from about 100° F. to about 150° F. and a pressure of from about 20 mm. Hg to about 760 mm. Hg for from about 30 minutes to about 20 hours. During this "B" staging phase, the roving package is continuously rotated about its horizontal axis, at a rate of from about 6 to about 15 revolutions per minute, in order to provide uniformity of resin distribution throughout the package.

Having fully described our invention, it is intended to be limited only by the lawful scope of the appended claims.

We claim:

1. The method of uniformly impregnating a dry package of wound fiberous glass material comprising subjecting the package to vacuum, completely submerging the dry package in a liquid medium containing a heat curable thermosetting resin composition having an intermediate partially cured state and which resin initially is free of cross-linking, applying pressure to the resin medium containing said package until the package has taken up a volume of the resin medium equal to $V_m$, $V_m$ being calculated in accordance with the following equation $$V_m = V_p - W_p/\rho_r$$

wherein $V_m$ is the volume of resin medium taken up by the glass fibers, $V_p$ is the volume of the package being impregnated exclusive of any core opening, $W_p$ is the weight of the dry untreated package exclusive of any core, and $\rho_r$ is the density of the glass fiber from which the package was prepared, removing the impregnated package from the unabsorbed liquid resin medium and heating the impregnated package to convert the absorbed resin within the package to the partially cured state and drive off any volatiles present within the impregnated package.

2. A method in accordance with claim 1 wherein the resin composition is a heat curable epoxy composition.

3. A method in accordance with claim 1 wherein the resin composition is a heat curable phenolic resin.

4. A method in accordance with claim 1 wherein the resin composition is a heat curable polyester resin.

5. A method in accordance with claim 1 wherein the resin medium has a viscosity of less than 20,000 centipoise measured at 25° C.

References Cited

UNITED STATES PATENTS

| 2,031,094 | 2/1936 | Brandwood | 8—155 X |
| 2,354,110 | 7/1944 | Ford et al. | 117—126 X |
| 2,946,698 | 7/1960 | Brunnick et al. | 117—126 X |
| 3,322,566 | 5/1967 | Bright | 117—124 |
| 1,920,191 | 8/1933 | Ford et al. | 117—119 X |
| 2,099,132 | 11/1937 | Miller | 117—119 |
| 2,903,389 | 9/1959 | Fujita | 117—113 X |
| 2,946,096 | 7/1960 | Stahl | 264—137 |
| 3,007,813 | 11/1961 | Levecque et al. | 117—126 |

ALFRED L. LEAVITT, *Primary Examiner.*

W. L. SOFFIAN, H. COHEN, *Assistant Examiners.*